US012169757B2

(12) United States Patent
Simpson

(10) Patent No.: US 12,169,757 B2
(45) Date of Patent: *Dec. 17, 2024

(54) SYSTEM AND METHOD FOR EXTRACTING A COMPUTER READABLE CODE FROM A CAPTURED IMAGE OF A DISTRIBUTION ITEM

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,673

(22) Filed: Jul. 20, 2023

(65) Prior Publication Data

US 2023/0359846 A1 Nov. 9, 2023

Related U.S. Application Data

(63) Continuation of application No. 17/540,801, filed on Dec. 2, 2021, now Pat. No. 11,755,858.

(Continued)

(51) Int. Cl.
*G06K 7/14* (2006.01)
*G06T 3/4023* (2024.01)
(Continued)

(52) U.S. Cl.
CPC ......... *G06K 7/1443* (2013.01); *G06K 7/1413* (2013.01); *G06T 3/4023* (2013.01); *G06T 7/13* (2017.01); *G06T 7/73* (2017.01)

(58) Field of Classification Search
CPC ...... G06K 7/1443; G06K 7/1413; G06K 7/14; G06K 7/1417; G06K 19/06028; G06T 7/73; G06T 7/13; G06T 3/4023

(Continued)

(56) References Cited

U.S. PATENT DOCUMENTS 5,120,940 A 6/1992 Willsie
6,634,555 B1 * 10/2003 Sorrells .............. G06K 7/10851
235/462.25

(Continued)

FOREIGN PATENT DOCUMENTS

CN 109784328 A 5/2019
GB 2388230 A 11/2003
(Continued)

OTHER PUBLICATIONS

Chai et al. "Locating and Decoding EAN-13 Barcodes from Images Captured by Digital Cameras", Information, Communications and Signal Processing, 2005 Fifth International Conference on Bangkok, Thailand, pp. 1595-1599. Dec. 6, 2005.

(Continued)

*Primary Examiner* — Edwyn Labaze
(74) *Attorney, Agent, or Firm* — Knobbe Martens Olson & Bear LLP

(57) ABSTRACT

The present disclosure relates to a system and a method for extracting a computer readable code from a captured image of a mailpiece or parcel using downsampling and edge detection. The system can include a reader configured to capture an image of an item having a computer readable code positioned thereon and a processor in data communication with the reader. The processor can generate captured image data of the item including the computer readable code, downconvert the captured image data to generate a downconverted image data and detect an edge of the computer readable code. The processor can also identify a position of the computer readable code in the downconverted image data and store or process only the identified computer readable code.

20 Claims, 8 Drawing Sheets

Related U.S. Application Data

(60) Provisional application No. 63/121,450, filed on Dec. 4, 2020.

(51) Int. Cl.
 *G06T 7/13* (2017.01)
 *G06T 7/73* (2017.01)

(58) Field of Classification Search
 USPC .... 235/462.02, 462.07, 462.01, 494, 462.25, 235/462.2
 See application file for complete search history.

(56) References Cited

U.S. PATENT DOCUMENTS

| | | | |
|---|---|---|---|
| 6,837,432 | B2 | 1/2005 | Tsikos et al. |
| 9,213,875 | B1 | 12/2015 | Nadabar et al. |
| 10,346,659 | B1 | 7/2019 | Ahmed et al. |
| 2002/0196977 | A1 | 12/2002 | Navon |
| 2008/0008379 | A1 | 1/2008 | Andel |
| 2009/0159510 | A1* | 6/2009 | Haushalter ........... G01N 21/643 252/301.36 |
| 2009/0289121 | A1 | 11/2009 | Maeda et al. |
| 2011/0121069 | A1 | 5/2011 | Lindahl et al. |
| 2011/0222605 | A1 | 9/2011 | Kashiwagi et al. |
| 2012/0256007 | A1 | 10/2012 | Cok |
| 2013/0105582 | A1 | 5/2013 | Yates et al. |
| 2014/0347557 | A1* | 11/2014 | Gomita ................ H04N 7/0117 348/441 |
| 2015/0054821 | A1 | 2/2015 | Kumar et al. |
| 2018/0232611 | A1* | 8/2018 | Guo ................. G06K 19/06103 |
| 2019/0325183 | A1 | 10/2019 | Tscherepanow et al. |
| 2020/0092470 | A1 | 3/2020 | Tanioka et al. |

FOREIGN PATENT DOCUMENTS

| | | |
|---|---|---|
| JP | H0793474 A | 4/1995 |
| WO | WO 2020/091206 A1 | 5/2020 |

OTHER PUBLICATIONS

International Search Report and Written Opinion dated Jan. 20, 2022, in International Application No. PCT/US2021/052208.

International Search Report and Written Opinion dated Feb. 23, 2022, in International Application No. PCT/US2021/061650.

Katona et al. "A Novel Method for Accurate and Efficient Barcode Detection with Morphological Operations", 2012 Eighth International Conference on Signal Image Technology and Internet Based Systems, IEEE Computer Society, pp. 307-314. Nov. 25, 2012.

International Search Report and Written Opinion dated Aug. 28, 2023, corresponding to International Application No. PCT/US2023/020257.

Extended Search Report dated Sep. 27, 2024 in European Application No. 21901479.2, in 7 pages.

\* cited by examiner

SYSTEM AND METHOD FOR EXTRACTING A COMPUTER READABLE CODE FROM A CAPTURED IMAGE OF A DISTRIBUTION ITEM

CROSS-REFERENCE TO RELATED APPLICATION(S)

This application is a continuation of U.S. application Ser. No. 17/540,801, filed on Dec. 2, 2021, which claims the benefit of priority to U.S. Provisional Application No. 63/121,450 filed on Dec. 4, 2020, the entire contents of both of which are hereby incorporated in their entirety. Furthermore, any and all applications for which a foreign or domestic priority claim is identified in the Application Data Sheet as filed with the present application are hereby incorporated by reference under 37 CFR 1.57.

BACKGROUND

Technical Field

The described technology generally relates to image processing, and in particular to a system and method for extracting a computer readable code from a captured image of a mailpiece or parcel using downsampling and edge detection.

Description of the Related Technology

Items, such as articles of mail (e.g., letters, flats, parcels, and the like), warehouse inventories, or packages are frequently received into a processing facility in volume, and must be sorted into particular groups to facilitate further processes such as, for example, delivery of the item to a specified destination. The particular groups can correspond to destinations or other information identified on the item. Processing items or articles can include reading and processing barcode data placed on the items or articles.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for image processing.

One aspect is a system for extracting a computer readable code from a captured image of a mailpiece or parcel, the system comprising: a reader configured to capture an image of an item having a computer readable code positioned thereon; and a processor in data communication with the reader and configured to: generate captured image data of the item including the computer readable code; downconvert the captured image data to generate a downconverted image data; detect an edge of the computer readable code; identify a position of the computer readable code in the downconverted image data; and store or process only the identified computer readable code.

In the above system, prior to the storing or processing, the processor is further configured to upconvert the downconverted image data to the original captured image data and store or process only the computer readable code in the original image data. In the above system, the captured image data comprises an image of the item, and wherein in downconverting the captured image data, the processor is configured to downconvert a resolution of the captured image from a higher resolution to a lower resolution at a downconversion ratio. In the above system, the captured image data comprises an image of the item, and wherein in downconverting the captured image data, the processor is configured to select the downconversion ratio in such a way that the processor sufficiently detects the edge in a lower resolution image.

In the above system, the captured image data comprises an image of the item, and wherein in downconverting the captured image data, the processor is configured to reduce a size of the captured image to a smaller size. In the above system, the captured image data comprises binary data of the item having a first pixel size, and wherein in downconverting the binary data, the processor is configured to reduce a pixel size of the binary data to a second pixel size smaller than the first pixel size. In the above system, the captured image data comprises binary data of the item, and wherein in downconverting the binary data, the processor is configured to decimate or discard at least some pixels of the binary data.

In the above system, the computer readable code comprises a barcode including a plurality of bars. In the above system, the captured image data comprises binary data of the item, and wherein in detecting the edge of the computer readable code, the processor is configured to detect a border between a white space and a beginning or ending bar of the plurality of bars, and determine the beginning or ending bar as the edge of the barcode. In the above system, the processor is further configured to remove a pixel area representing a non-barcode region.

In the above system, the processor is configured to remove the pixel area representing a non-barcode region using an image mask. In the above system, in the computer readable code comprises at least one of the following: an intelligent barcode including an Intelligent Mail® package barcode (IMpb), a UPC barcode, an EAN barcode, a Code39 barcode, a Code 128 barcode, an ITF barcode, a Code 93 barcode, a Codabar barcode, a GS1databar barcode, an MSI Plessey barcode, a QR code, a Datamatrix code, a PDF417 code or an Aztec code.

Another aspect is a method of extracting a computer readable code from a captured image of a mailpiece or parcel, the method comprising: capturing, at a reader, an image of an item having a computer readable code positioned thereon; generating, at a processor, captured image data of the item including the computer readable code; downconverting, at the processor, the captured image data to generate a downconverted image data; detecting, at the processor, an edge of the computer readable code; identifying, at the processor, a position of the computer readable code in the downconverted image data; and storing or processing, at the processor, only the identified computer readable code.

In the above method, prior to the storing or processing, further comprising upconverting the downconverted image data to the original captured image data and store or process only the computer readable code in the original image data. In the above method, the captured image data comprises an image of the item, and wherein the downconverting comprises downconverting a resolution of the captured image from a higher resolution to a lower resolution at a downconversion ratio.

In the above method, the captured image data comprises an image of the item, and wherein the downconverting comprises selecting the downconversion ratio in such a way that the processor sufficiently detects the edge in a lower resolution image. In the above method, the captured image data comprises an image of the item, and wherein the downconverting comprises reducing a size of the captured image to a smaller size. In the above method, the captured image data comprises binary data of the item having a first pixel size, and wherein the downconverting comprises reducing a pixel size of the binary data to a second pixel size smaller than the first pixel size.

In the above method, the captured image data comprises binary data of the item, and wherein the downconverting comprises decimating or discarding at least some pixels of the binary data. In the above method, the computer readable code comprises a barcode including a plurality of bars, and wherein the captured image data comprises binary data of the item, and wherein the detecting comprises detecting a border between a white space and a beginning or ending bar of the plurality of bars, and determining the beginning or ending bar as the edge of the barcode.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system for extracting a computer readable code from a captured image of a mailpiece or parcel using downsampling and edge detection. Furthermore, any aspect of a system for extracting a computer readable code from a captured image of a mailpiece or parcel using downsampling and edge detection can be configured to perform a method of another aspect.

In one aspect described herein, a system for processing items, comprises: a reader configured to capture an image of an item having a computer readable code positioned thereon; and a processor in data communication with the reader and configured to: obtain captured image data of the item, the image data including the computer readable code; downconvert the captured image data of the item to generate a downconverted image of the item, the downconverted image being smaller in size than the captured image data; detect an edge of the computer readable code in the downconverted image data; identify a position of the computer readable code in the downconverted image data based at least in part on the detected edge of the computer readable code; and store or process only the portion of the image data corresponding to the identified position of the computer readable code.

In some embodiments, the system further comprises a memory configured to receive the captured image data from the reader and store the received captured image data, the processor configured to receive the captured image data from the reader or retrieve the captured image data from the memory, to obtain the captured image data.

In some embodiments, prior to the storing or processing, the processor is further configured to upconvert the downconverted image data to the original captured image data and store or process only the portion of the original image data corresponding to the identified position of the computer readable code In some embodiments, the captured image data comprises an image of the item, and wherein in downconverting the captured image data, the processor is configured to downconvert a resolution of the captured image from a higher resolution to a lower resolution at a downconversion ratio.

In some embodiments, the captured image data comprises an image of the item, and wherein in downconverting the captured image data, the processor is configured to select the downconversion ratio to detect the edge in a lower resolution image.

In some embodiments, the captured image data comprises an image of the item, and wherein in downconverting the captured image data, the processor is configured to reduce a size of the captured image to a smaller size.

In some embodiments, the captured image data comprises binary data of the item having first pixel dimensions, and wherein in downconverting the binary data, the processor is configured to reduce the binary data to second pixel dimensions, smaller than the first pixel dimensions.

In some embodiments, the captured image data comprises binary data of the item, and wherein in downconverting the binary data, the processor is configured to decimate or discard at least some pixels of the binary data.

In some embodiments, the computer readable code comprises a barcode including a plurality of bars, wherein the captured image data comprises binary data of the item, and wherein in detecting the edge of the computer readable code, the processor is configured to detect a border between a white space and a beginning or ending bar of the plurality of bars, and determine the beginning or ending bar as the edge of the barcode.

In some embodiments, the processor is further configured to remove a pixel area representing a non-barcode region.

In some embodiments, the processor is configured to remove the pixel area representing a non-barcode region using an image mask.

In some embodiments, the computer readable code comprises at least one of the following: an intelligent barcode including an Intelligent Mail® package barcode (IMpb), a UPC barcode, an EAN barcode, a Code39 barcode, a Code 128 barcode, an ITF barcode, a Code 93 barcode, a Codabar barcode, a GS1databar barcode, an MSI Plesscy barcode, a QR code, a Datamatrix code, a PDF417 code or an Aztec code.

In another aspect described herein, a method of extracting a computer readable code from a captured image of a mailpiece or parcel, the method comprises capturing, at a reader, an image of an item having a computer readable code positioned thereon; storing, at a memory, the captured image data; obtaining, at a processor, captured image data of the item including the computer readable code either from the reader or the memory; downconverting, at the processor, the captured image data of the item to generate a downconverted image data of the item, the downconverted image data being smaller in size than the captured image data; detecting, at the processor, an edge of the computer readable code in the downconverted image; identifying, at the processor, a position of the computer readable code in the downconverted image data based at least in part on the detected edge of the computer readable code; and storing or processing, at the processor, a portion of the downconverted image data corresponding to the identified position of the computer readable code.

In some embodiments, prior to the storing or processing, further comprising upconverting the downconverted image data to the original captured image data and store or process only a portion of the original image data corresponding to the identified location of the computer readable code.

In some embodiments, the captured image data comprises an image of the item, and wherein the downconverting comprises downconverting a resolution of the captured image from a higher resolution to a lower resolution at a downconversion ratio.

In some embodiments, the captured image data comprises an image of the item, and wherein the downconverting comprises selecting the downconversion ratio to detect the edge in a lower resolution image.

In some embodiments, the captured image data comprises an image of the item, and wherein the downconverting comprises reducing a size of the captured image to a smaller size.

In some embodiments, the captured image data comprises binary data of the item having first pixel dimensions, and wherein the downconverting comprises reducing the binary data to second pixel dimensions, smaller than the first pixel dimensions.

In some embodiments, the captured image data comprises binary data of the item, and wherein the downconverting comprises decimating or discarding at least some pixels of the binary data.

In some embodiments, the computer readable code comprises a barcode including a plurality of bars, wherein the captured image data comprises binary data of the item, and wherein the detecting comprises detecting a border between a white space and a beginning or ending bar of the plurality of bars, and determining the beginning or ending bar as the edge of the barcode.

BRIEF DESCRIPTION OF THE DRAWINGS

The foregoing and other features of the disclosure will become more fully apparent from the following description and appended claims, taken in conjunction with the accompanying drawings. Understanding that these drawings depict several embodiments in accordance with the disclosure and are not to be considered limiting of its scope, the disclosure will be described with additional specificity and detail through use of the accompanying drawings.

DETAILED DESCRIPTION

Figure 1A:
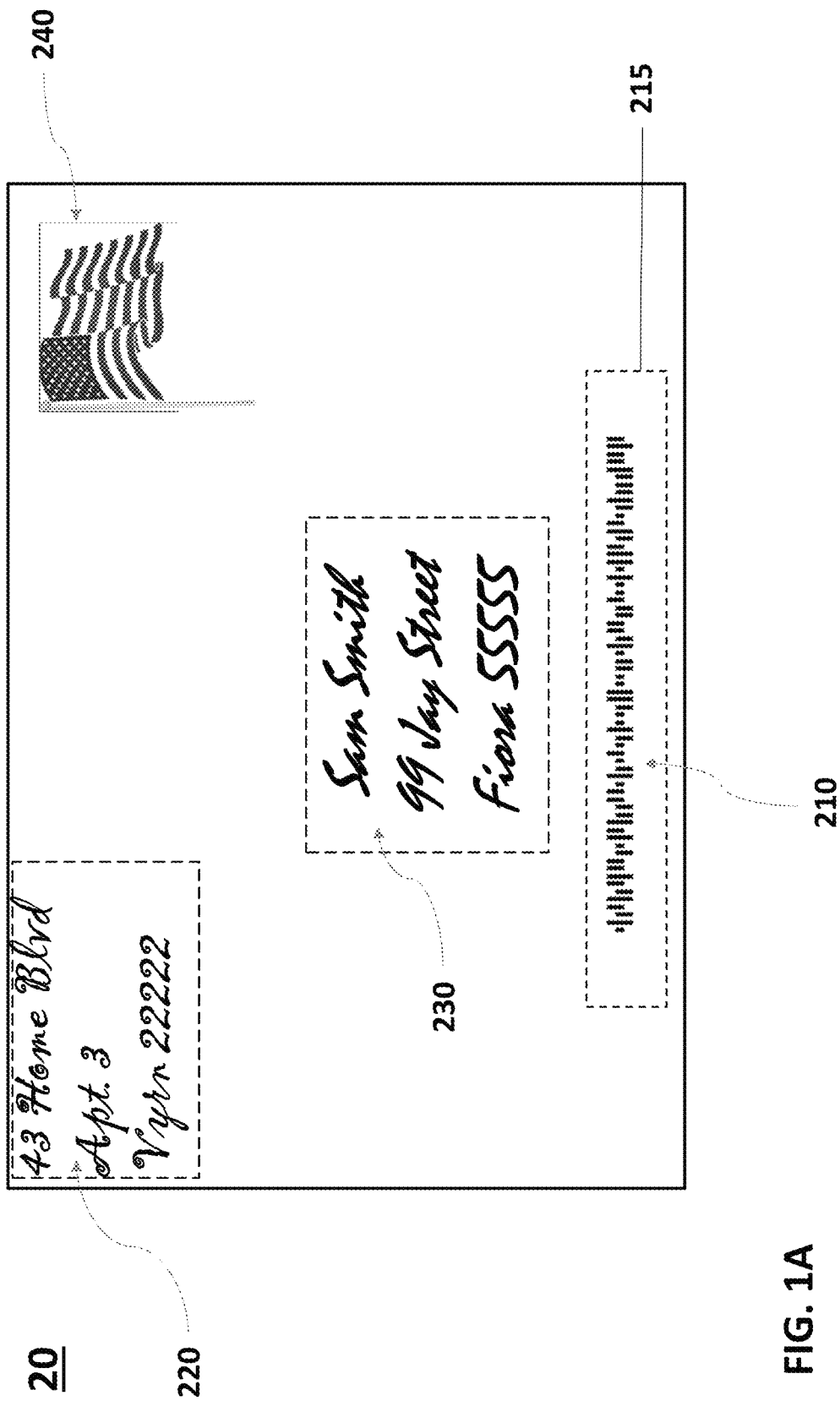
FIG. 1A is an example item having a barcode according to some embodiments.

Provided herein are various embodiments of systems and methods for image processing including, for example, a system and method for extracting a computer readable code such as a barcode from a captured image of a mailpiece or parcel using downsampling (or downconversion) and edge detection on the captured image. Since image processing can be significantly simpler and faster with downsampled/downconverted images compared to processing full scale images, the functionality of computing devices such as an item processing system is significantly improved. Furthermore, since the extracted computer readable code with a reduced data size is stored, a memory space can also significantly be saved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

Mail piece or parcel items are sorted and the information (e.g., addresses, types of items, barcode, etc.) about them are scanned in an item processing facility. Thus, hereinafter, the item processing facility will be described first. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, or otherwise interpret a destination end point from each item processed. The destination end point may be encoded in a computer readable code, such as a barcode printed on or affixed to the item. In some embodiments, the destination end point may be read by taking an image of the item and performing an optical character recognition (OCR) process on the image, and determining the delivery end point from the OCR'd address. In some embodiments, the item processing equipment can apply a computer readable code that encodes the delivery end point and may print or spray the computer readable code onto the item. In some embodiments, the processing facility uses sorting/sequencing apparatuses which can process over about 30,000 items per hour.

In item processing, using, for example, mail processing equipment, sortation apparatuses, and the like, an image of an item is captured and processed, and analyzed to identify a computer readable code thereon, using, for example, optical character recognition or other techniques. The image of the item is taken, for example, by a scanner, camera, or other similar device on item processing equipment. Analyzing the entire captured image of an item can be time consuming and can require a large memory space and more processor resources for processing the images. Efficiency can be improved and processing requirements can be reduced when only a region of interest (ROI) in the image of the item is analyzed. In some embodiments, the ROI can be the area of the image which includes a computer readable code, an address block, or other information. The systems described herein can identify the ROI in an image which contains a computer readable code, address, or other information to be read or decoded, in order to improve efficiency, reduce computing resource requirements, etc. Various embodiments provide a system and method for extracting or detecting an ROI using downsampled images and edge detection such that ROI can be more efficiently detected or extracted from an image of an item. Exemplary items or labels and regions of interest will be described.

Although certain types of barcodes are described in this disclosure, various embodiments can be applied to other types of barcodes including, but not limited to, one-dimensional barcode types (e.g., UPC barcode, EAN barcode, Code39 barcode, Code 128 barcode, ITF barcode, Code 93 barcode, Codabar barcode, GS1databar barcode and MSI Plessey barcode) and two-dimensional barcodes (e.g., QR code, Datamatrix code, PDF417 code and Aztec code). Furthermore, although various embodiments are described with reference to an item barcode that is placed on a mail or an item for delivery, the present disclosure is not limited thereto and can be applied to non-mail barcodes (e.g., barcodes placed on products for sale, exhibit, or advertisement, etc.). Moreover, although various embodiments are described with reference to some standard format barcodes and barcodes used by the USPS, the present disclosure is not limited thereto and can be used by other entities that make or ship products containing barcodes.

Various embodiments involve extracting information from a region of interest, such as a computer readable code such as a barcode from a captured image of a mailpiece or parcel using downsampling and edge detection. In some embodiments, the systems described herein can be used to identify the address block on an image of an item as the ROI. Then, OCR or other character recognition processes need be performed only on the identified ROI and not on the entire captured image.

In some embodiments an image captures an entirety or a portion of an item containing a barcode that includes bars and spaces having different widths. Here, the bars mean lines (e.g., black lines) and the spaces mean empty spaces (e.g., white spaces) next to the bars and having a color different from that of the bars. Although various embodiments are described based on black bars and white spaces, the bars may have non-black colors and the spaces may have non-white colors, as long as the bars and spaces can be distinctively recognized by a computing device (e.g., optical scanner or controller).

A bar on a barcode has a vertically extending height and a horizontally extending width generally less than the height. Barcode bars may have different or same heights and/or widths. For example, the widths of at least some bars disposed between neighboring spaces may be different from those of other bars. Similarly, barcode spaces may have different or same widths. For example, the widths of at least some spaces disposed between neighboring bars may be different from those of other spaces. The bars and spaces may be alternately arranged in the barcode. Each barcode may have a unique arrangement of bars and spaces so as to contain a unique set of information associated with an item itself, item delivery and/or data processing, etc. In some embodiments, the height of the bars can be used to encode information, for example, in a four-state barcode having ascending, descending, full, and tracker bars. Example four-state barcodes can be USPS's IMb and IMpb.

FIG. 1A illustrates an item 20 that has a barcode 210 thereon according to some embodiments. The item 20 may additionally include a sender section 220, a recipient section 230 and a postage section 240. The item 20 shown in FIG. 1A is merely an example item, and certain elements may be modified or removed, and/or other elements or equipment may be added. For example, although the item 20 of FIG. 1A contains only one barcode, it can also include two or more barcodes depending on the embodiments. Furthermore, although FIG. 1A shows a letter type item, other types of items, such as parcels, flats, and the like can also be used. The item 20 may be processed by the system shown in FIG. 2.

The barcode 210 may include an Intelligent Mail® package barcode (IMpb). The IMpb is a barcode that can be read by automated parcel processing equipment and scanning devices, and includes a data string that generally follows the GS1-128 specification. The IMpb may include a variable length format that is determined by the elements selected by the sender, and supply tracking and routing data for packages and extra service applications. The IMpb may be used on commercial packages, and on other items of customers requesting extra services. The barcode 210 may also include other types of computer readable codes described above. In the FIG. 1A embodiment, an ROI 215 is the area of the image of the item which includes the barcode 210. In some embodiments, the ROI 215 may be the recipient section 230. In some embodiments, the ROI 215 can include both the recipient section and the barcode 210. Systems and processes described herein can identify the ROI 215 in the image of the item 20.

Figure 1B:
FIG. 1B is an exemplary item having barcodes thereon according to some embodiments.
Figure 2:
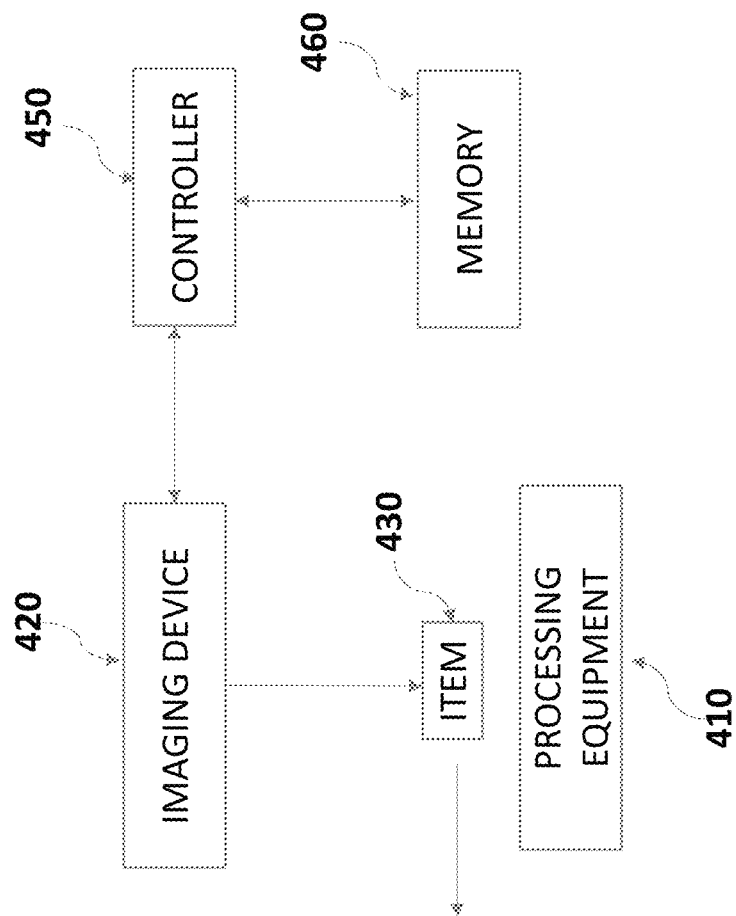
FIG. 2 illustrates an item processing system for extracting a region of interest from a captured image of an item using downsampling and edge detection according to some embodiments.

FIG. 1B illustrates an example image showing an item 25 that contains barcodes 250 and 260 according to some embodiments. The item 25 shown in FIG. 2B is merely an example label, and certain elements may be modified or removed, and/or other elements or equipment may be added. For example, although the item 25 of FIG. 1B contains two barcodes, it can also include a single barcode or three or more barcodes depending on the embodiments. In the FIG. 1B embodiment, an ROI 265 is an area surrounding the barcode 260. The item 25 may be processed by the system shown in FIG. 2.

The item 25 may be a printed label and include sorting, processing, and routing information such as recipient mailing address, sender address, class of service, tracking number, postage payment, etc. In some embodiments, a region of interest of the item 25 may include return address region, recipient address region, barcode region, or the like. In some embodiments, the region of interest may include other information or region in the item 25.

FIG. 2 illustrates an item processing system 40 for processing items which may have one or more computer readable codes. The item processing system 40 may include processing equipment 410, an imaging device (hereinafter to be interchangeably used with an optical scanner or a reader) 420, a controller 450 and a memory 460. The item processing system 40 shown in FIG. 2 is merely an example processing system, and certain elements may be modified or removed, and/or other elements or equipment may be added. Although only one imaging device is shown in FIG. 2, two or more imaging devices can be provided depending on the embodiment.

In some embodiments, the processing equipment 410 may include an automated letter sorting machine used for letter-size mail, flats, parcels, and the like, that are barcoded and/or which have addresses thereon. The processing equipment 410 may include a conveyor belt (not shown) that moves items from one location to another. The imaging device 420 can scan letters or flat items being conveyed by the processing equipment 410. The imaging device 420 can also scan items such as parcels, residual mail, and the like.

The processing equipment 410 may automatically sort items by conveying each of them past the imaging device 420 that captures an image of an item 430 that is being conveyed through, in or by the item processing equipment 410, for example, on a conveyor (e.g., in the direction of the arrow). The imaging device 420 may capture an entirety or a portion of one side of the item 430 facing the imaging device 420. The imaging device 420 may capture information relevant to processing and/or delivery such as names and addresses of senders and recipients, postage and barcodes, etc. The barcodes may include an IMpb or other barcodes described above. The imaging device 420 can be a camera, a scanner, a laser device, or other type of imaging device. The imaging device 420 can output a digital image in color, grayscale, black and white, or binarized data. In some embodiments, the imaging device 420 can capture an image, and can convert the image to binarized data or to another data format. In some embodiments, the imaging device 420 can capture an image, and the controller 450 can receive and convert the captured image to binarized data or to another data format.

In some embodiments, the captured image may include one or more of the images 20 and 25 shown in FIGS. 1A and 1B. In some embodiments, the captured image may include only barcode portions 210, 250 or 260 shown in FIGS. 1A and 1B.

In some embodiments, the system 40 may include at least one of a front scanner (not shown) disposed in front of the item 430 or an upper scanner (not shown) above the item 430. The position of the scanners may be altered or changed without departing from the scope of the present disclosure. The front scanner may scan a label of the item 430 containing a barcode and disposed on the front side of the item 430. The upper scanner may scan a label containing a barcode and disposed on the top surface of the item 430.

The imaging device 420 may continuously and separately capture images of items being transported past the imaging device 420. In some embodiments, the imaging device 420 or a connected processor may convert the captured images into digital data, such as binary data. In some embodiments, the imaging device 420 may send the captured images to the controller 450 so that the controller 450 may convert the received captured images into binary data. In some embodiments, the controller 450 may receive color, grayscale, or black and white image data. The controller 450 can convert the color or grayscale image to a black and white image, and then can convert the image to binary data.

In some embodiments, the captured images or digital data thereof may be stored in the memory 460 in any of a variety of standard image formats. In some embodiments, the captured images or digital data thereof may be stored in a memory of the imaging device 420 or a memory of the controller 450. The imaging device 420 may be connected to the controller 450 either by wire or wirelessly. In some embodiments, the captured images or digital data thereof may be stored in a network memory such as a cloud or other device separately located from the elements 420, 450 and 460. The captured images or digital data thereof may also be transmitted to a receiving device via a communication network (wired or wireless). The digital data may include binary data. For example, in binary image data a "0" represents a white pixel and "1" represents a black pixel, or vice versa. Hereinafter, for the purpose of convenience, and not by way of limitation, binary data will be described as an example of digital data.

In some embodiments, at least one of the imaging device 420 or the controller 450 may read and process a captured image of an item or a label to extract a region of interest (ROI) such as a barcode placed on the item. In some embodiments, the image can be captured and stored in a variety of image formats. The controller 450 can then convert the captured image from its stored format into binary data through binarization. In some embodiments, the imaging device 420 can capture image data as binary data or can convert the image data to binary data and can pass the binary data to the memory 460 via the controller 450 to store the data. The binary data can be subjected to downsampling and edge detection. For example, at least one of the imaging device 420 or the controller 450 may downconvert captured image data (analog or digital) into a smaller scale image data, detect an edge of the ROI and identify the position of the ROI. At least one of the imaging device 420 or the controller 450 may remove non-ROI region data and only process the ROI region data. This process will be described in greater detail below.

Figure 3:
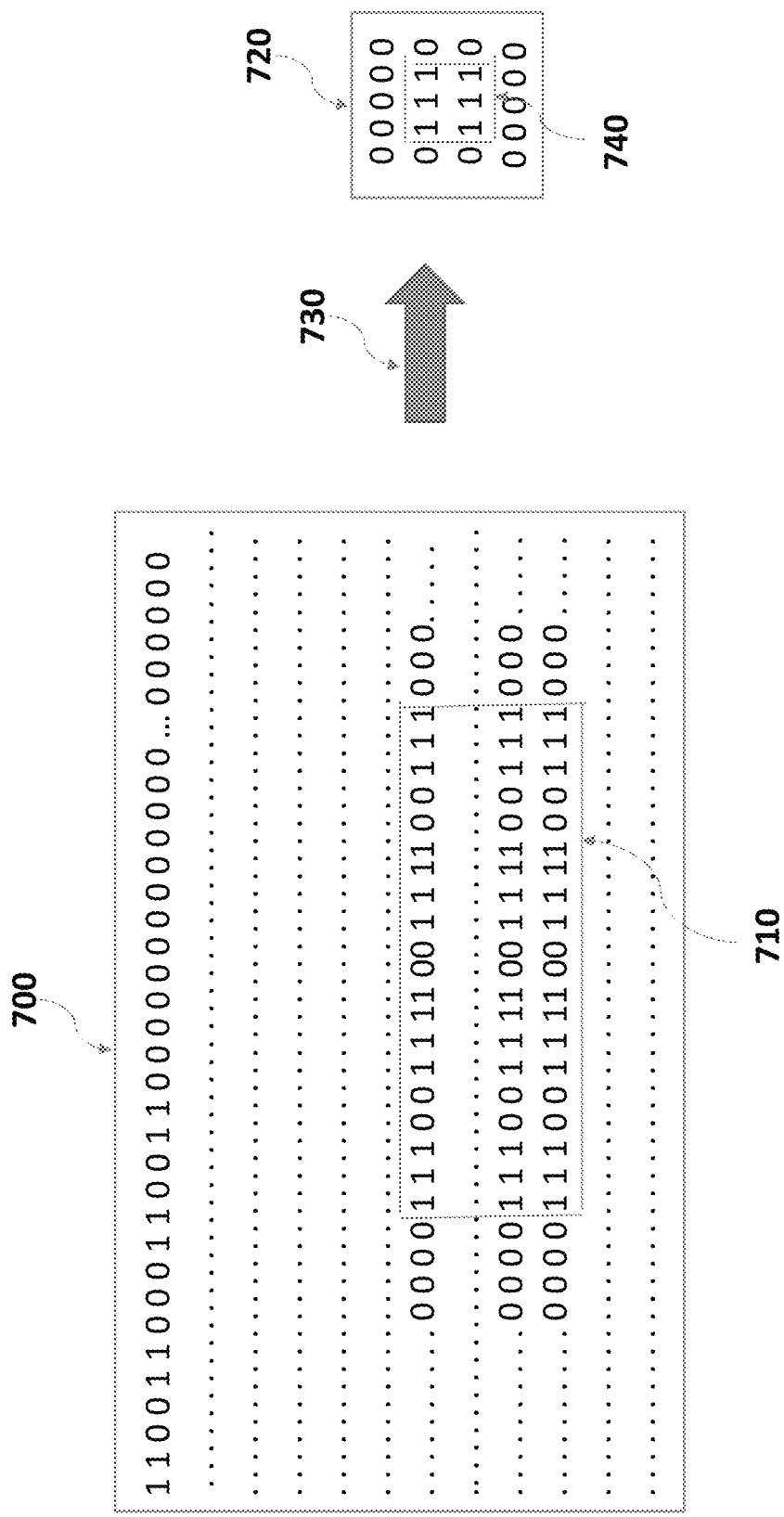
FIG. 3 is a conceptual diagram of extracting a region of interest from a captured image of an item using downsampling and edge detection according to some embodiments.

FIG. 3 is a conceptual diagram for extracting a region of interest from an example set of binary data 700 of a captured image of an item using downsampling and edge detection according to some embodiments. The example set of binary data 700 may represent an item such as the item 20 shown in FIG. 1A or a label such as the label 25 shown in FIG. 1B or. The binary data 700 may include a set of pixel values 710 that represents a region of interest such as a barcode. The binary data 700 may include a combination of a white pixel and a black pixel. The white pixel may be represented by "0" and the black pixel may be represented by "1." In FIG. 3, dots can represent either zeros or ones. The black pixel may represent a black image, text, handwritten characters, scribbling, and/or bars, and pixel value "0" may represent a background and space between adjacent bars. FIG. 3 is merely an example set of binary data and other configuration of binary data may also be used.

The systems and processes described herein downconvert the binary data 700 of the original captured image into a reduced size binary data 720 and identify a set of pixel values 740 representing a region of interest such as a barcode. The set of pixel values 740 may correspond to the barcode pixel values 710 in the binary data 700 of the original captured image. For example, the set of pixel values 740 may be a downconverted version of the original barcode pixel values 710. A downsampling process 730, can reduce the resolution of the image, for example, such that a ROI becomes a black spot or area of the image. A downsampled image may have the appearance of a zoomed out image, where individual letters, words, markings, etc., in areas of an image where they are not concentrated will appear simply as white space, and an area with an address or a barcode, where letters, markings, bars, symbols are concentrated will appear to run together and become a black area. The edge detection techniques can identify the black area in the downsampled image, identify which pixels of the downsampled image correspond to the pixels of the original image, and can crop or mask the image such that only the identified ROI is processed. The downconverting process 730 will be described in greater detail herein.

The barcode may have a dimension of horizontal length and a vertical height. In these embodiments, the set of pixel values 710 may have a horizontal pixel number corresponding to the horizontal length of the barcode and a vertical pixel number corresponding to the vertical height of the barcode. Furthermore, the set of pixel values 740 may also have a horizontal pixel number corresponding to the horizontal length of the barcode and a vertical pixel number corresponding to the vertical height of the barcode in the reduced set of binary data 720. The memory 460 may store pixel number information for the binary data 700 and the pixel set 710, and pixel number information for the binary data 720 and the pixel set 740. The memory 460 may also store a ratio of the horizontal and vertical pixel numbers of the binary data 700 to those of the pixel set 710. The memory 460 may also store a ratio of the horizontal and vertical pixel numbers of the binary data 720 to those of the pixel set 740. The memory may further store a ratio of the pixel size of the pixel set 710 to that of the pixel set 740. When the set of pixel values 710 or 740 representing the computer readable code is identified, the location of the set of pixel values 710 or 740 can be compared to or combined with the image data to act as a mask or filter, and only the image data in the location of the image corresponding to the set of pixel values 710 or 740 is passed to a barcode parser or decoder.

Figure 4:
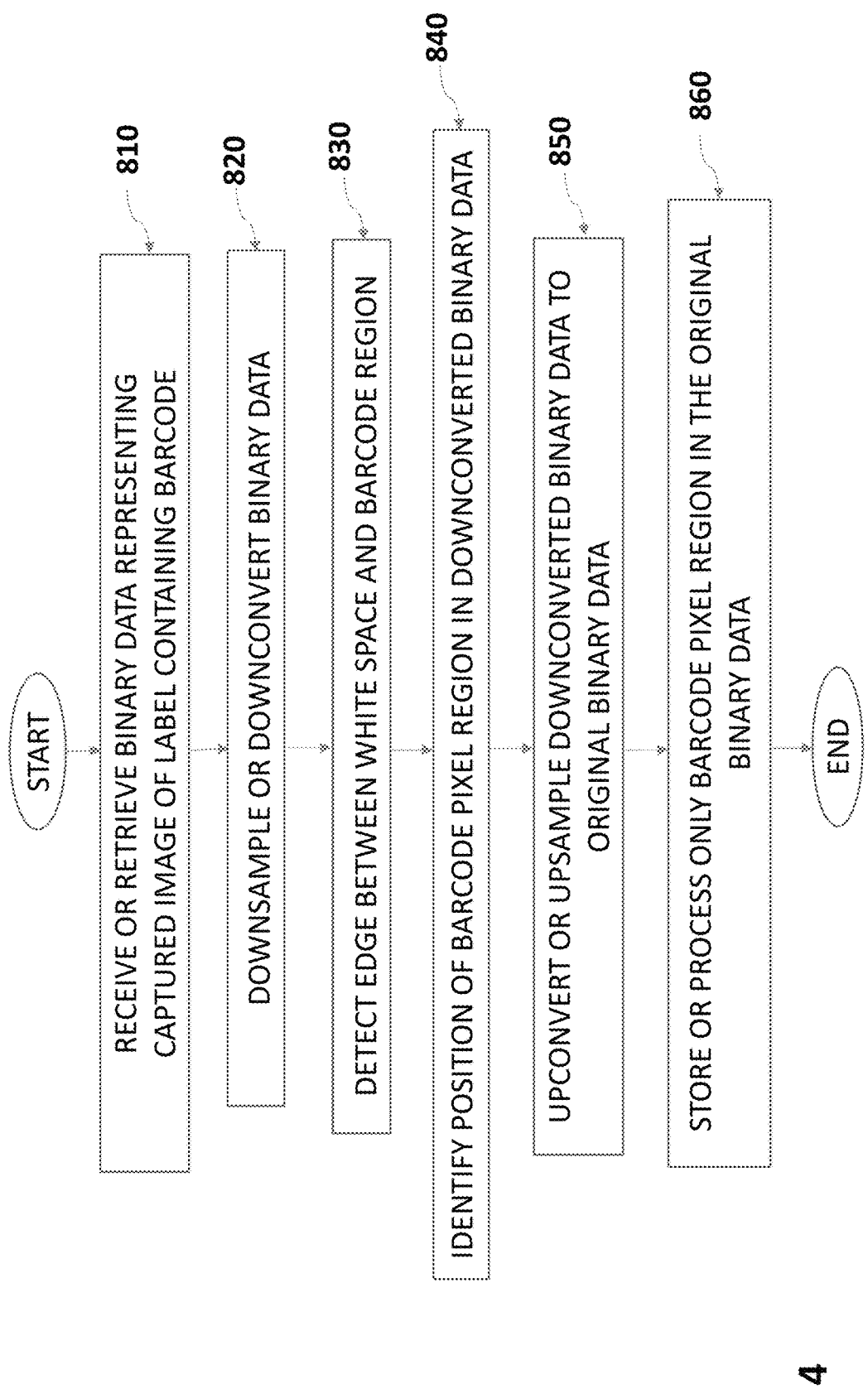
FIG. 4 is a process flow diagram of a method for extracting a region of interest from a captured image of an item using downsampling and edge detection according to some embodiments.

FIG. 4 is a process flow diagram 800 of a method for extracting a region of interest from a captured image of an item using downsampling and edge detection according to some embodiments. In some embodiments, the captured image may include binary data 700 of the item shown in FIG. 3. Although the process flow diagram 800 is described herein with reference to a particular order, in various embodiments, states herein may be performed in a different order, or omitted, and additional states may be added. This may apply to the process flow diagram 600 shown in FIG. 6. A region of interest may include return address region, recipient address region, barcode region, or the like. For the purpose of convenience, the description will be provided based on the region of interest being a barcode region provided on an item or a label. Referring to FIG. 3, the process flow diagram 800 of FIG. 4 will be described.

For the purpose of convenience, FIG. 4 will be described based on the controller 450 performing the process flow diagram 800. Referring to FIG. 4, in state 810, the controller 450 may receive or retrieve data representing a captured image of an item or a label containing a computer readable code. The received or retrieved binary data may include the binary data 700 shown in FIG. 3. In some embodiments, the controller 450 may receive the binary data 700 from the imaging device 420. In these embodiments, the imaging device 420 may capture an image of an item and convert the captured image into binary data. In some embodiments, the controller 450 may receive the captured image in a number of different formats from the imaging device 420, convert the captured image into binary data and store the binary data 700 in the memory 460. In these embodiments, the controller 450 may retrieve the binary data 700 from the memory 460.

In state 820, the controller 450 may downsample or downconvert (see 730 in FIG. 3) the binary data 700 of the captured image into a smaller sized binary data such as a pixel set 720 shown in FIG. 3. In some embodiments, in downconverting the binary data 700, the controller 450 may decimate, discard or throw away at least some pixels of the binary data 700. For example, if the binary data 700 is an A×B pixel array, the controller 450 may decimate some of the binary data 700 such that the downconverted binary data is an a×b pixel array, where "a" is less than A and "b" is less than B. Depending on the embodiments, "a" can be significantly smaller than A, and "b" can be significantly smaller than B. For example, the ratio of "A" to "a" may be 10:1, 20:1, 50:1, 100:1 or 500:1, etc. In some embodiments, a 400×300 pixel array may be converted into a 4×3 pixel array or an 8×6 pixel array. These numbers are merely examples, and other converting options are also possible. In some embodiments, the controller 450 may downconvert the received or retrieved binary data 700 in such a way that the controller 450 can sufficiently detect an edge of the barcode in a reduced pixel set (or a downconverted pixel set) 720 shown in FIG. 3. In some embodiments, the controller 450 may downconvert the binary data 710 such that the downconverted data includes a reduced ROI region 740 (e.g., two rows of 11 in FIG. 3) in the reduced pixel set 720. In some embodiments, the controller 450 may decimate, discard or throw away proportionally all the pixel values or disproportionally more white pixel values (or 0 values) in downconverting or downsampling the binary data 700.

In some embodiments, the downsampling process may reduce the size by a first downconversion ratio. The edge detection process may be performed on the reduced image data. If the processor determines that an edge cannot be detected, or that there are multiple areas of the image which have detectable edges, the processor may reduce the size of the original image by a second downconversion ratio, which is higher than the first downconversion ratio, or may further reduce the size of the downconverted image by a second downconversion ratio. The edge detection process may be performed again. The process can be iterated as necessary in order to identify a downconversion ratio which allows for quick identification of a single ROI, or a small number of detected edges. In some embodiments, the first downconversion ratio can be a set ratio, and the second down conversion ratio can be a variable ratio. In some embodiments, the first and second downconversion ratios can be dynamically determined, for example, by determining the pixel dimensions of an image, e.g., how many pixels in each direction, the resolution of the camera being used, the type of item being imaged, etc.

In state 830, the controller 450 may detect an edge between a white space and a barcode region 740. As shown in FIG. 3, the edge may be a bordering portion of the barcode region 740 bordering the white space. For example, the bordering portion may include beginning and ending bars of the barcode region 740 bordering the white space. The bordering portion may also include top and bottom portions of the bars in the barcode region 740 bordering the upper and lower white spaces. In some embodiments, the edge detection can be performed by another processor other than the controller 450.

In state 840, the controller 450 may determine a position of the barcode pixel region (or address region) 740 in the downconverted binary data set 720 based on the edge detected in state 830. The controller 450 may identify a bar pixel region (or a barcode region such as the barcode region 740) including a plurality of bars from the binary data 720. A barcode includes a plurality of bars. Each bar has a major axis (or a vertically extending height) and a minor axis (or a horizontally extending width generally (but not necessarily) less than the height). Barcode bars may have different or same widths. For example, the widths of at least some bars may be different from those of other bars. In some barcodes, bars can have the same width, and may have various heights, such as in a 4 state barcode. Each barcode may have a unique arrangement of bars and spaces so as to contain a unique set of information associated with an item itself, item delivery and/or data processing, etc.

In the binary data, the barcode has a certain number of horizontal pixels for different widths, and a certain different number of vertical pixels for the heights. In one barcode, for example, the height, or number of pixels for each of the bars may be the same or nearly the same, whereas the number of pixels in the width can vary. Depending on the type of a barcode, the pixel numbers may be different. For example, a barcode having a particular format has particular sizes of the major axis and minor axis. Another barcode having another different format has different sizes of the major axis and minor axis. The major axes of bars may have certain numbers of pixels which are generally the same in the bars of a given barcode. The minor axes of bars may have a certain range of pixel numbers at least some of which are different from those of the other bars. Although the major axes are generally (but not necessarily always) the same in the bars of the same barcode, some of the minor axes can be different. These different minor axes may have a particular range on a particular barcode. These ranges may be different depending on the barcodes.

The memory 460 may store information including barcode types, barcode formats, pixel numbers for major axes and a range of pixel numbers for the minor axes. The memory 460 may also store information including pixel numbers for major axes and a range of pixel numbers for the minor axes, and the relationships between pixel numbers of the set of binary data 700 and pixel numbers of the downconverted pixel set 720. The memory 460 may store these pixel number relationships according to a downsampling or downconverting ratio. For example, when the binary data 700 prior to the downsampling is a 1000×800 pixel set, the downconverted pixel set 720 may be a 10×8 pixel set, if the downconverting ratio is 100:1. Similarly, when the pre-downconverted binary data 700 is a 1000×800 pixel set, the downconverted pixel set 720 may be a 5×4 pixel set as shown in FIG. 3, if the downconverting ratio is 200:1. Furthermore, since the set of binary data 710 representing an ROI (e.g., a barcode) in the original binary data 700 is reduced to the pixel set 740 after the downconverting (730), the number of pixels in the set of binary data 710 may be proportionally reduced to the pixel set 740 in the downconverted pixel set 720.

Although not shown in FIG. 4, the process flow diagram 800 may include an additional state in which the controller 450 may determine a type of a barcode from the binary data received or retrieved in state 810. Once the type of the barcode is determined, the controller 450 may determine a barcode region based on particular pixel numbers for major axes, a range of pixel numbers for minor axes, and a range of pixel numbers for the entire width of the barcode in the original binary data 700 and the downconverted binary data 720 and the stored relationship therebetween. In some embodiments, the memory 460 may store instructions and/or the above-identified information to perform the additional state.

To identify the ROI in the barcode, or to identify the pixel region of the barcode, the controller 450 or other processor can process the binary data of an image, such as that shown in FIG. 3. The controller 450 may identify pixel groupings which have the same value, that is, either groups of ones or zeros. The controller 450 can identify a plurality of groups of pixels, for example, pixels having a "1" value which all have the same height, or all of which have similar heights. In some embodiments, where a barcode has a set number of bars, the controller 450 can identify the ROI by identifying the set number of pixel groupings all of which have the same or similar size within the binary data. The controller 450 can identify the groups of pixels having the same or similar heights as the region of interest. The controller 450 can identify heights of pixels where the image is oriented as shown in FIGS. 1A and 1B. The controller 450 can also perform these operations on images or binary data which is skewed or differently oriented. In this case, the height of the groups of pixels does not necessary correspond to a y-axis, a vertical direction, etc.

The controller 450 can further identify the minor axes of the groups of pixels having a "1" value. If the minor axes of the groups of pixels having similar heights are all the same, the controller 450 may not identify those groups as an ROI having a barcode. In some embodiments, if the minor axes of the groups of pixels vary within known parameters, such as relative widths, the controller 450 may identify the groups of pixels as corresponding to bars in a barcode, and can identify the region of interest as including the groups of pixels.

In state 850, the controller 450 upconverts or upsamples the entire downconverted binary data (see 720 in FIG. 3) back to the original binary data (see 700 in FIG. 3). The controller 450 may perform a reverse operation of the downconverting or downsampling process described above to restore the original binary data 700. The controller 450 may identify the pixel values 710 corresponding to the ROI in the upconverted original binary data 700 based on the detected ROI in the downsampled image. In some embodiments, the state 850 may be omitted. In these embodiments, the controller 450 may store or process the pixel values 740 in the downconverted pixel set 720 in state 860, which the controller 450 may then use with the original image to identify the ROI in the original captured image. Furthermore, the controller 450 may store in the memory 460 a relationship between the pixel values 740 in the downconverted pixel set 720 and the pixel values 710 in the original binary data 700 so that the controller 450 may restore the original pixel values 710 from the pixel values 740 of the downconverted pixel set 720 and the stored relationship at a later time.

In state 860, the controller 450 may store or process only the pixels of the barcode region 710 in the original pixel data 700, for example, to decode, parse, or read the barcode. According to various embodiments, the item processing can be faster, as the controller 450 can process only the region of interest compared to existing methods. Furthermore, the controller 450 can process only the region of interest such as the barcode region compared to processing the entire set of binary data of a captured image. In some embodiments, the controller 450 or another processor can perform edge detection on the masked image to identify the beginning and ending bars of the barcode, and can use this information to crop down the image to only the barcode portion of the image. Moreover, the controller 450 can determine the region of interest more quickly as the controller 450 may process the much smaller set of the binary data to locate the ROI in the downconverted binary data.

In some embodiments, between the states 840 and 850, the controller 450 or another processor may remove a certain area of pixels representing a non-barcode pixel region from the downconverted binary data 720. Furthermore, between the states 850 and 860, the controller 450 or another processor may remove a certain area of pixels representing a non-barcode pixel region from the upconverted binary data 700. The non-barcode pixel region may include the remaining area of the binary data excluding the barcode pixel region 710. In some embodiments, the controller 450 may remove the non-barcode pixel region using a pixel mask or an image mask. An image mask is a black or white image of the same dimensions as the original image. Each of the pixels in the mask can have therefore a value of 0 (white or black) or 1 (black or white). When executing operations on the image, the mask may be used to restrict the result to the pixels that are 1 in the mask. In some embodiments, the mask can be a software algorithm that removes pixels or pixel values from the original image which are not within the defined ROI identified in the barcode pixel region. In some embodiments, the mask can convert pixels to 0, or white pixels, or to any other desired value, in the area that is not the ROI. In this way the operation may restrict to some parts of the image. In some embodiments, the mask can be applied by identifying the location of the groups of pixels which make up the barcode, and applying those pixel locations to the image as it existed before it was converted to binary data or binarized. The controller 450 or the other processor can then convert all the pixels of the image before binarization to white pixels, or any other desired color. In some embodiments, the controller 450 or the other processor can crop the image such that the only portion of the image remaining corresponds to the ROI identified in step 840. In some embodiments, the controller 450 may move the identified barcode pixel region to another memory or another location of the memory 460 which is different from a location of the memory 460 that stores the binary data 700 or 720. In these embodiments, the controller 450 may not need to remove the non-barcode pixel region.

Figure 5:
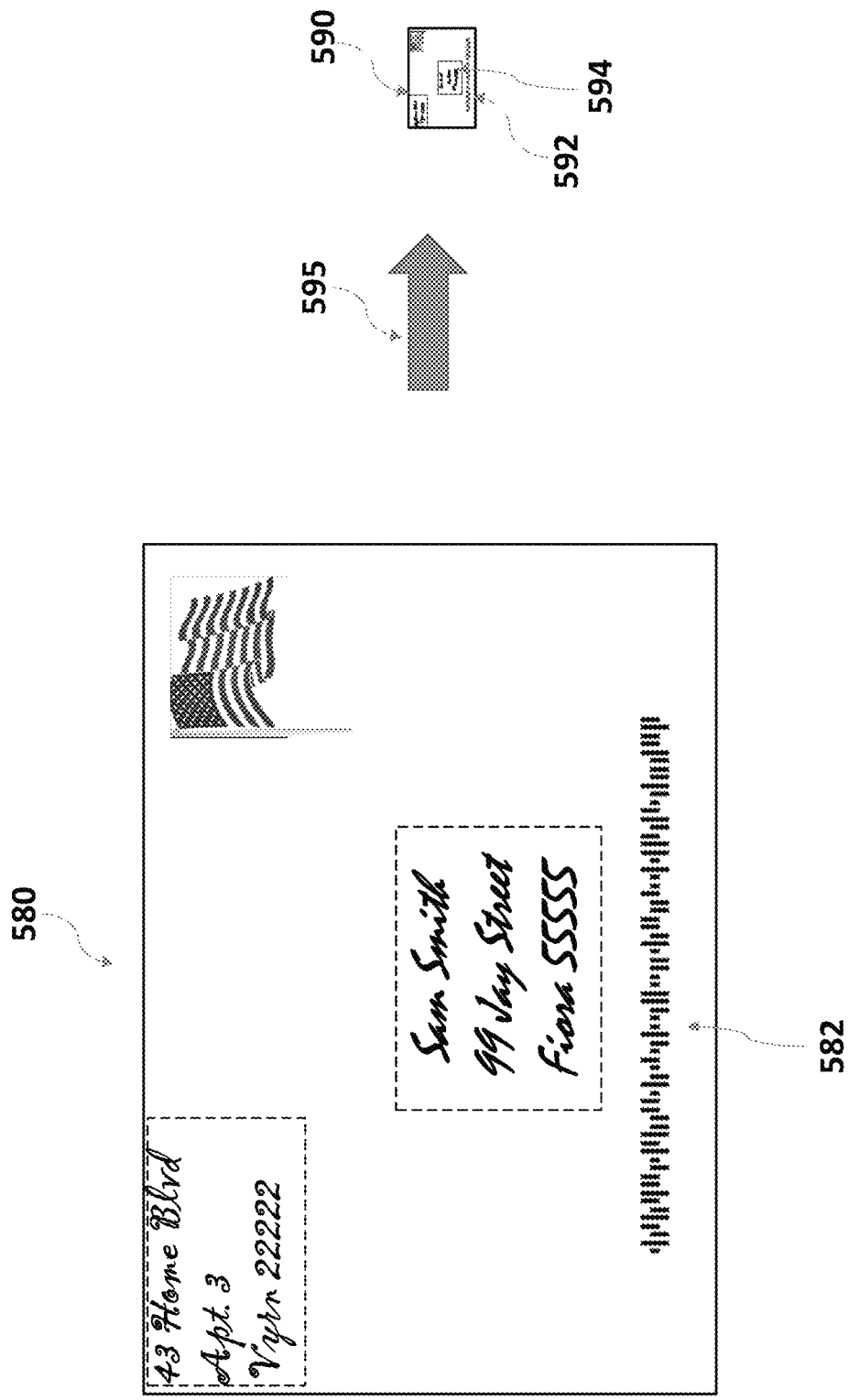
FIG. 5 is a conceptual diagram for extracting a region of interest from a captured image of an item using downsampling and edge detection according to some embodiments.
Figure 6:
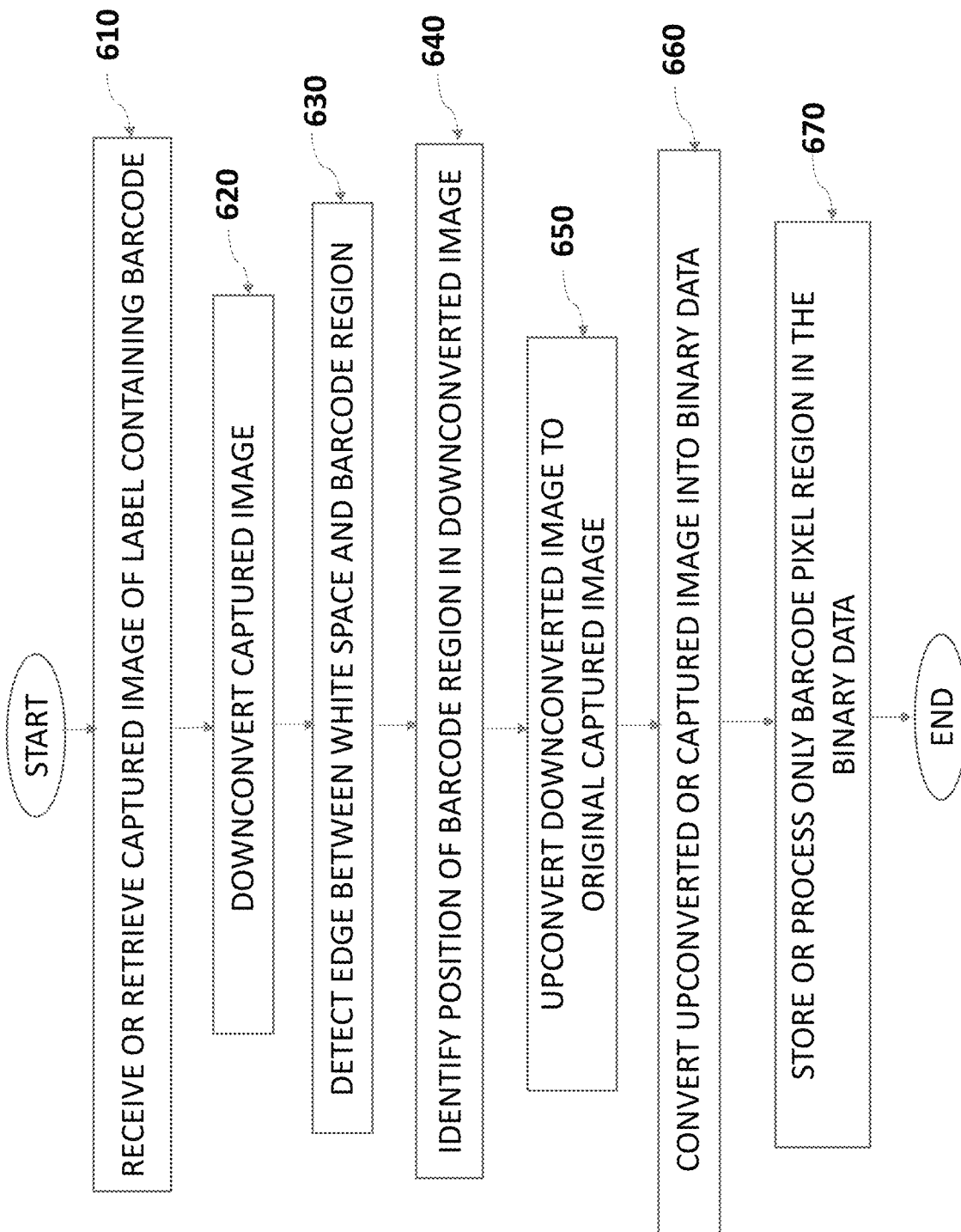
FIG. 6 is a process flow diagram of a method for extracting a region of interest from a captured image of an item using downsampling and edge detection according to some embodiments.

FIG. 5 is another conceptual diagram of extracting a region of interest from a captured image of an item using downsampling and edge detection according to some embodiments. FIG. 6 is another process flow diagram 600 of a method for extracting a region of interest from a captured image of an item using downsampling and edge detection according to some embodiments.

In some embodiments, the process flow diagram 600 may be performed by at least one of the imaging device 420 or the controller 450. In some embodiments, the process flow diagram 600 may be performed by another computing device separate from and/or in data communication with at least one of the imaging device 420 or the controller 450. For the purpose of convenience, FIG. 6 will be described based on the controller 450 performing the process flow diagram 600. Referring to FIG. 5, the process flow diagram 600 of FIG. 6 will be described.

Referring to FIG. 6, in state 610, the controller 450 may receive or retrieve a captured image 580 of an item or a label containing a barcode 582 shown in FIG. 5. In some embodiments, the controller 450 may receive the captured image from the imaging device 420. In some embodiments, the controller 450 may retrieve the captured image from the memory 460. This image data may be in a variety of image formats. The process described herein can be performed on non-binarized image data. In these embodiments, the memory 460 may receive the captured image from the imaging device 420 and stores the received image thereon.

In state 620, the controller 450 may downconvert (see 595 in FIG. 5) the captured image 580 to a smaller sized image 590 as shown in FIG. 5. In some embodiments, in downconverting the captured image, the controller 450 may downsample or downsize the resolution of the captured image 580 from a higher resolution to a lower resolution at a predetermined downsampling ratio. The downsampling ratio may depend on the application. The downsampling ratio may be, for example, 1:5, 1:10, 1:25, 1:100, 1:500, 1:1,000, etc. These are merely example ratios, and other downsampling ratios can also be used. The higher the downsampling ratio, the faster the processing by the controller 450. In some embodiments, the controller 450 may downsample the captured image 580 in such a way that the controller 450 can sufficiently detect an edge 594 (e.g., edge of a barcode) in the lower resolution image 590 shown in FIG. 5. In some embodiments, in downconverting the captured image 580, the controller 450 may shrink or reduce the captured image 580 to the smaller image 590 as shown in FIG. 5. The controller 450 may shrink the captured image 580 in such a way that the controller 450 can sufficiently detect the edge 594 in the shrunk image 590.

In state 630, the controller 450 may detect an edge 594 between a white space and a barcode region 592 in the downconverted image 590. As shown in FIG. 5, the edge 594 may be a bordering portion of the barcode region 592 bordering the white space. For example, the bordering portion may include beginning and ending bars of the barcode region 592 bordering the white space. In some embodiments, the edge detection can be performed by another processor other than the controller 450. In state 640, the controller 450 may determine a position of the barcode region 592 in the downconverted image 590 based on the edge 594 detected in state 640.

In state 650, the controller 450 may upconvert or upsample the downconverted image 590 to the original captured image 580. The controller 450 may perform a reverse operation of the downconverting or downsampling process described above to restore the original image 580. In state 660, the controller 450 may convert the image into binary data that includes pixels representing the identified barcode region 582 based on the position identified in state 640.

In state 670, the controller 450 may store or process only the binary data of the upconverted barcode region 582 in the original captured image 580, for example, to decode, parse, or read the barcode. In some embodiments, the controller 450 may convert the captured image into binary data, and store or process only the identified barcode region having a binary data format.

In some embodiments, the state 650 may be omitted. In these embodiments, the controller 450 may store or process the identified barcode region in an analog format. Furthermore, the controller 450 may convert the identified barcode region 592 into binary data and store the converted binary data for further processing. In these embodiments, the controller 450 may store a relationship between the larger barcode region 582 and the smaller barcode region 592 in the memory 460. The relationship may include, but is not limited to, the downsampling ratio described above. The controller 450 may obtain binary values of the larger barcode region 582 based on the relationship and the converted binary data of the smaller barcode region 592.

In some embodiments, prior to state 670, the controller 450 may remove the non-ROI region from the binary data. The controller 450 may also move the identified barcode pixel region to another memory or another location of the memory 460 which is different from a location of the memory 460 that stores the binary data. In these embodiments, the controller 450 may not need to remove the non-barcode pixel region.

In some embodiments, the original image or upconverted image need not be converted to binary data, but can be analyzed using OCR or other techniques to read the barcode and/or an address region. In this way, the OCR process need not analyze the entire image, but only the region of the image where the barcode or address is likely to be, saving time and resources.

According to various embodiments, the item processing can be faster, as the controller 450 can process only the region of interest compared to existing methods. Furthermore, the controller 450 can process only the region of interest such as the barcode region compared to processing the entirety of a captured image.

Figure 7:
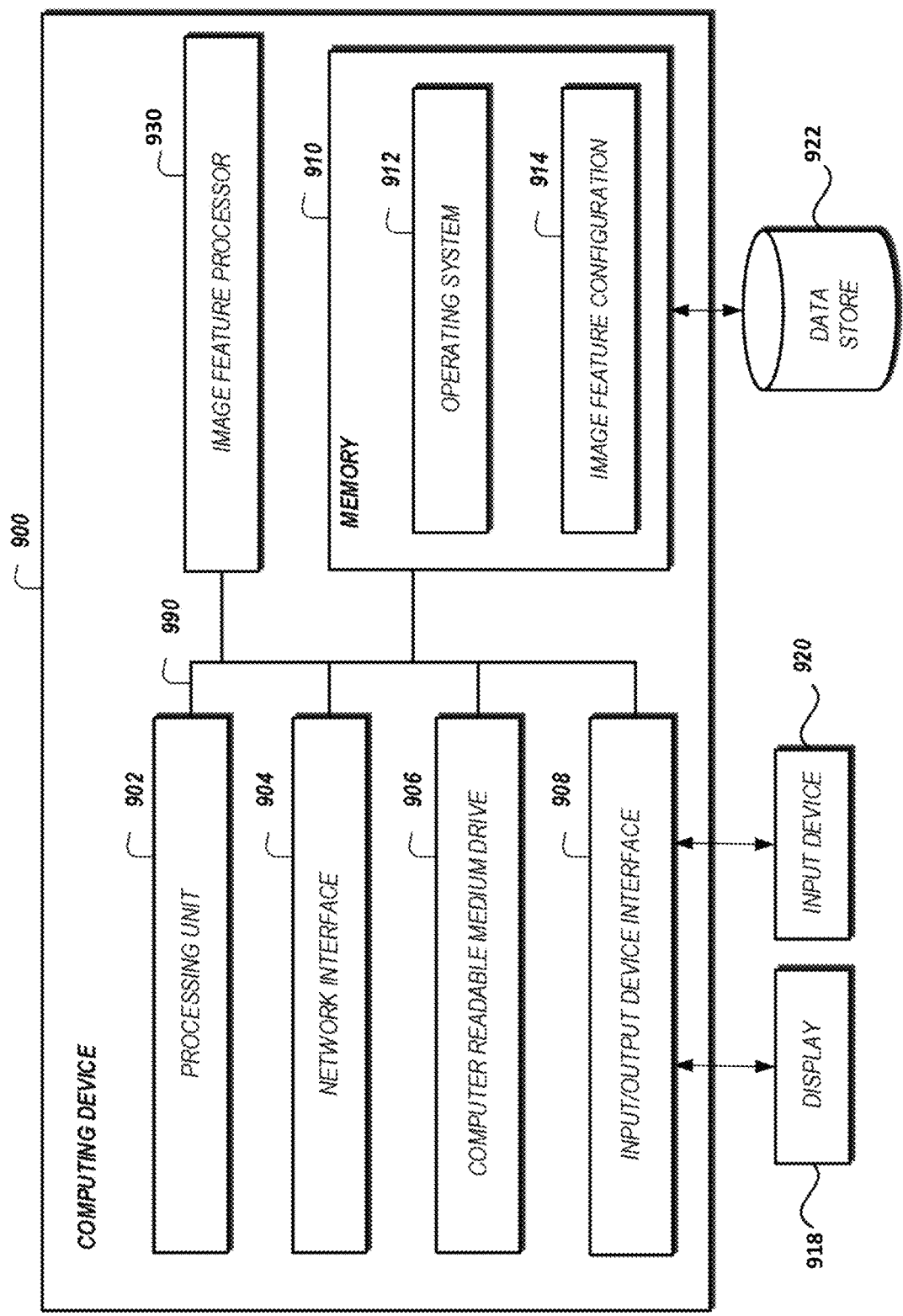
FIG. 7 is a block diagram of an example controller illustrated in FIG. 2 according to some embodiments.

FIG. 7 is a block diagram of an embodiment of a computing device 900 for implementing the process flow diagrams 800 and 600 described above with respect to FIGS. 4 and 6. FIG. 7 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. In some embodiments, the computing device 900 may implement the features of one or more of the imaging device 420 and the controller 450. In some embodiments, at least some elements of the computing device 900 may be included in one or more of the imaging device 420, the controller 450, or another processor to perform an entirety or part of the flow diagrams shown in FIGS. 4 and 6. In still other embodiments, the computing device 900 may be in data communication with one or more of the imaging device 420 and the controller 450 to perform an entirety or part of the procedures shown in FIGS. 4 and 6.

The network interface 904 can provide connectivity to one or more networks or computing systems. The network interface 904 can receive information and instructions from other computing systems or services via the network interface 904. The network interface 904 can also store data directly to the memory 910. The processing unit 902 can communicate to and from the memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more of the embodiments described above. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 7. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for processing items, the system comprising:
   a reader configured to capture an image of an item, the item comprising a computer readable code and additional item information positioned thereon, the additional item information spaced apart and different from the computer readable code; and
   one or more processors in data communication with the reader and configured to:
      obtain a captured image of the item, the captured image including the computer readable code, the computer readable code storing retrievable information associated with the item;
      downconvert the captured image to generate a downconverted image of the item, the downconverted image being smaller in size than the captured image;
      detect an edge of the computer readable code in the downconverted image;
      identify a region of the computer readable code in the downconverted image, comprising images of the computer readable code and the additional item information, based at least in part on the detected edge of the computer readable code in the downconverted image; and
      store or process only the identified region of the computer readable code such that the additional item information is not stored or processed.

2. The system of claim 1, further comprising a memory configured to receive the captured image from the reader and store the received captured image, at least one of the one or more processors configured to receive the captured image from the reader or retrieve the captured image from the memory, to obtain the captured image.

3. The system of claim 1, wherein, prior to the storing or processing, at least one of the one or more processors is further configured to upconvert the downconverted image to the original captured image and store or process only a portion of the original captured image corresponding to the identified region of the computer readable code in the downconverted image.

4. The system of claim 1, wherein in downconverting the captured image at least one of the one or more processors is further configured to downconvert a resolution of the captured image from a higher resolution to a lower resolution at a downconversion ratio.

5. The system of claim 4, wherein at least one of the one or more processors is further configured to select the downconversion ratio to detect the edge in a lower resolution image.

6. The system of claim 1, wherein at least one of the one or more processors is further configured to:
   select a portion of the captured image representing only the computer readable code from the downconverted image based on the identified region of the computer readable code in the downconverted image; and
   store or process only the selected portion of the captured image representing only the computer readable code.

7. The system of claim 1, wherein in detecting the edge of the computer readable code, at least one of the one or more processors is further configured to detect a border between a white space and the computer readable code, and determine the detected border as the edge of the computer readable code.

8. The system of claim 1, wherein at least one of the one or more processors is configured to downconvert the captured image at a downsampling ratio sufficient to enable the at least one of the one or more processors to detect the edge of the computer readable code in the downconverted image.

9. A system for processing items, the system comprising:
   a reader configured to capture an image of an item, the item comprising a computer readable code positioned thereon, the computer readable code comprising a barcode including a plurality of bars and the captured image data comprising binary data of the item;
   one or more processors in data communication with the reader and configured to:
      obtain a captured image of the item, the captured image including the computer readable code;
      downconvert the captured image of the item to generate a downconverted image of the item, the downconverted image comprising the computer readable code, the downconverted image being smaller in size than the captured image;
      detect a border between a white space and a beginning or ending bar of the plurality of bars, and determine the detected beginning or ending bar as an edge of the barcode;
      identify a region of the computer readable code in the downconverted image based at least in part on the detected edge of the computer readable code in the downconverted image; and
   store or process only the identified region of the computer readable code.

10. The system of claim 1, wherein the identified region of the computer readable code has an analog format, and wherein at least one of the one or more processors is further configured to convert the identified region of the computer readable code into digital data and store or process the digital data.

11. The system of claim 10, wherein at least one of the one or more processors is further configured to:
   store a relationship between a region of the computer readable code in the captured image and the identified region of the computer readable code in the downconverted image; and
   obtain digital values of the region of the computer readable code in the captured image based on the relationship and the converted digital data of the identified region of the computer readable code.

12. The system of claim 11, wherein the relationship comprises a downsampling ratio.

13. A method of extracting a computer readable code from a captured image of an item, the method comprising:

capturing, at a reader, an image of an item, the item comprising a computer readable code and additional item information positioned thereon, the additional item information spaced apart and different from the computer readable code, the computer readable code storing retrievable information associated with the item;

storing, at a memory, the captured image;

obtaining, at a one or more processors, the captured image of the item either from the reader or the memory, the captured image of the item including the computer readable code;

downconverting, at the one or more processors, the captured image of the item to generate a downconverted image of the item, the downconverted image being smaller in size than the captured image;

detecting, at the one or more processors, an edge of the computer readable code in the downconverted image;

identifying, at the one or more processors, a region of the computer readable code in the downconverted image, comprising images of the computer readable code and the additional item information, based at least in part on the detected edge of the computer readable code; and storing or processing, at the one or more processors, only the identified region of the computer readable code such that the additional item information is not stored or processed.

14. The method of claim 13, further comprising, prior to the storing or processing:

upconverting the downconverted image to the original captured image; and storing or processing only a portion of the original captured image corresponding to the identified region of the computer readable code in the downconverted image.

15. The method of claim 13, wherein the downconverting comprises downconverting a resolution of the captured image from a higher resolution to a lower resolution at a downconversion ratio.

16. The method of claim 15, wherein the downconverting comprises selecting the downconversion ratio to detect the edge in a lower resolution image.

17. The method of claim 15, further comprising:

selecting a portion of the captured image representing only the computer readable code from the downconverted image based on the identified region of the computer readable code in the downconverted image; and storing or processing only the selected portion of the captured image representing only the computer readable code.

18. The method of claim 15, wherein the detecting comprises:

detecting a border between a white space and the computer readable code; and determining the detected border as the edge of the computer readable code.

19. The method of claim 15, wherein the identified region of the computer readable code has an analog format, the method further comprising:

converting the identified region of the computer readable code into digital data; and storing or processing the digital data.

20. The method of claim 19, further comprising:

storing a relationship between a region of the computer readable code in the captured image and the identified region of the computer readable code in the downconverted image; and obtaining digital values of the region of the computer readable code in the captured image based on the relationship and the converted digital data of the identified region of the computer readable code.

* * * * *